(12) United States Patent
Teranishi et al.

(10) Patent No.: US 7,839,745 B2
(45) Date of Patent: Nov. 23, 2010

(54) METHOD AND APPARATUS FOR RECORDING INFORMATION ON OPTICAL DISC

(75) Inventors: Yasuhiko Teranishi, Yokohama (JP); Kenki Yoshihara, Tokyo-to (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 12/461,935

(22) Filed: Aug. 28, 2009

(65) Prior Publication Data

US 2009/0323499 A1 Dec. 31, 2009

(51) Int. Cl.
*G11B 7/00* (2006.01)
*G11B 7/24* (2006.01)

(52) U.S. Cl. ................... 369/53.24; 369/53.2; 369/47.1; 369/275.1; 369/283

(58) Field of Classification Search ....................... None
See application file for complete search history.

(56) References Cited

U.S. PATENT DOCUMENTS 5,930,225 A 7/1999 Ishida et al.
6,457,128 B1 9/2002 Gotoh et al.

FOREIGN PATENT DOCUMENTS

JP 2002-352522 12/2002

*Primary Examiner*—Muhammad N Edun
(74) *Attorney, Agent, or Firm*—Louis Woo

(57) ABSTRACT

An optical disc of a recordable type or a rewritable type has a plurality of recording layers including first and second recording layers. A laser beam is applied to the second recording layer through a used area in the first recording layer to record arbitrary information on at least a part of the second recording layer. The used area in the first recording layer has been used for at least one of information recording and data recording. Positional information is generated. The generated positional information is of a blank area in the second recording layer which occurs due to the presence of an unused area in the first recording layer. The blank area adjoins the unused area. The generated positional information is recorded on a predetermined area in the optical disc.

4 Claims, 11 Drawing Sheets

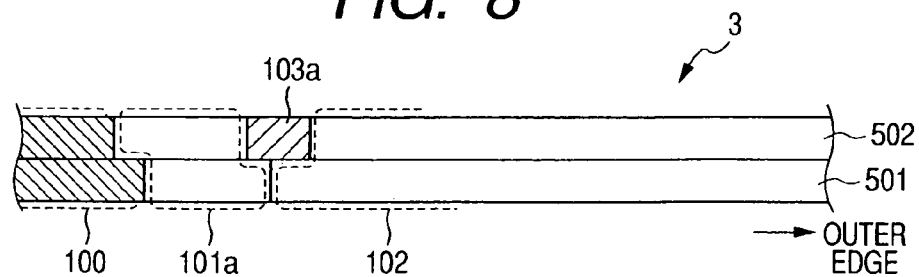
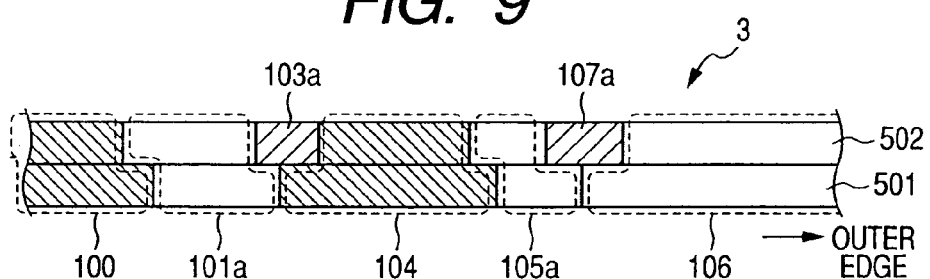
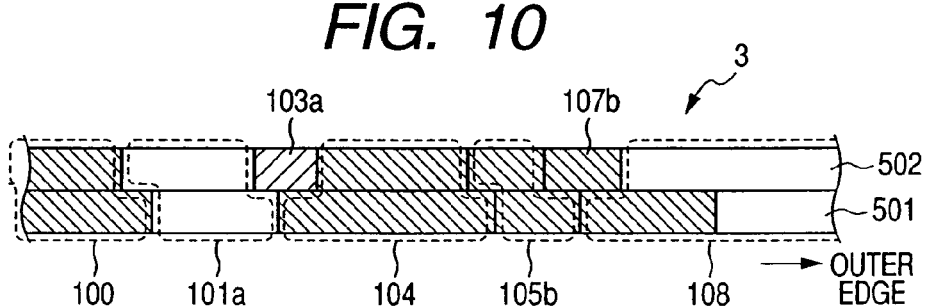
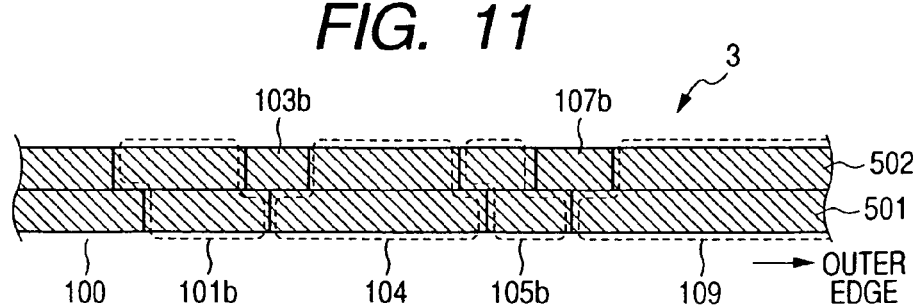

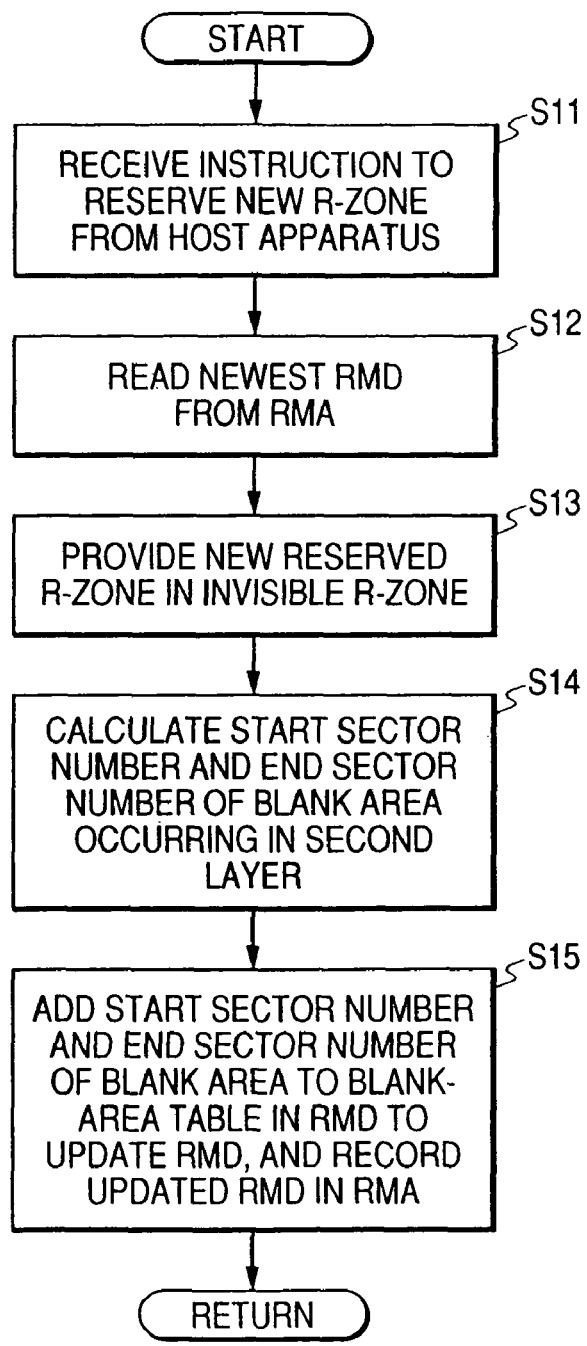

| BYTE POSITION | CONTENTS | BYTE NUMBER |
|---|---|---|
| N TO N+3 | START SECTOR NUMBER OF 1ST BLANK AREA | 4 |
| N+4 TO N+7 | END SECTOR NUMBER OF 1ST BLANK AREA | 4 |
| N+8 TO N+11 | START SECTOR NUMBER OF 3RD BLANK AREA | 4 |
| N+12 TO N+15 | END SECTOR NUMBER OF 3RD BLANK AREA | 4 |
| N+16 TO N+19 | START SECTOR NUMBER OF 4TH BLANK AREA | 4 |
| N+20 TO N+23 | END SECTOR NUMBER OF 4TH BLANK AREA | 4 |
| N+24 TO N+27 | 0 | 4 |

METHOD AND APPARATUS FOR RECORDING INFORMATION ON OPTICAL DISC

BACKGROUND OF THE INVENTION

1. Field of the Invention

This invention relates to a method and an apparatus for recording information on an optical disc such as a recordable or rewritable optical disc. In addition, this invention relates to a computer program for recording information on an optical disc. Furthermore, this invention relates to an optical disc.

2. Description of the Related Art

In a digital versatile disc recordable (DVD-R), new information can not be written over old information or previously-recorded information. Thus, new information is written on an unused area of the DVD-R while old information remains recorded on a used area thereof. The unused area means an area on which data is not recorded. The used area means a data-recorded area, that is, an area on which data has been recorded.

During the recording of main information on a DVD-R, management information is recorded and reproduced from the DVD-R to manage a used area and an unused area thereof.

DVD-Rs are of a few types including a single-layer single-sided type and a two-layer single-sided type.

Japanese patent application publication number P2002-352522A (corresponding to U.S. patent application publication number US-2002-136134-A1) discloses a typical prior-art apparatus for recording information on a DVD-R. The prior-art apparatus in Japanese application P2002-352522A is designed for a DVD-R having only one recording layer. In an assumed case where the prior-art apparatus is applied to a two-layer single-sided DVD-R, it may take a long time to search for a blank area at the time of closing a border in the DVD-R or finalizing the data recording thereon.

In addition, Japanese application P2002-352522A discloses a method of recording information on a DVD-R which is designed to enhance the reliability of data representative of recording management information. According to Japanese application P2002-352522A, data containing a first sync signal is recorded on the DVD-R and a second sync signal is recorded thereon by cutting beforehand. The method has (a) a step of recording the management information on a prescribed position in the DVD-R on the basis of the first sync signal, (b) a step of deciding whether or not the recording by the step (a) has been normally finished, and (c) a step of recording the management information on the prescribed position in the DVD-R on the basis of the second sync signal when the step (b) decides that the recording by the step (a) has not been normally finished.

SUMMARY OF THE INVENTION

It is a first object of this invention to provide an apparatus for recording information on an optical disc which can shorten a time taken to close borders in the optical disc and to finalize the data recording thereon.

It is a second object of this invention to provide a method of recording information on an optical disc which can shorten a time taken to close borders in the optical disc and to finalize the data recording thereon.

It is a third object of this invention to provide a computer program for recording information on an optical disc which can shorten a time taken to close borders in the optical disc and to finalize the data recording thereon.

It is a fourth object of this invention to provide an improved optical disc.

A first aspect of this invention provides an apparatus for recording information on an optical disc having a plurality of recording layers including first and second recording layers, the optical disc being of one of a recordable type and a rewritable type. The apparatus comprises first means for applying a laser beam to the second recording layer through a used area in the first recording layer to record arbitrary information on at least a part of the second recording layer, wherein the used area in the first recording layer has been used for at least one of information recording and data recording; second means for generating positional information of a blank area in the second recording layer which occurs due to the presence of an unused area in the first recording layer, the blank area adjoining the unused area; and third means for recording the positional information generated by the second means on a predetermined area in the optical disc.

A second aspect of this invention is based on the first aspect thereof, and provides an apparatus further comprising fourth means provided in the second means for generating positional information including positional information pieces of one or more blank areas inclusive of first and second blank areas in the second recording layer which occur due to the presence of first and second unused areas in the first recording layer respectively, the first and second blank areas adjoining the first and second unused areas respectively; a memory for storing the positional information generated by the fourth means; fifth means for recording an arbitrary information signal on the first unused area to change the first unused area to a used area; sixth means for recording a predetermined signal on the first blank area to change the first blank area to a used area after the fifth means records the arbitrary information signal on the first unused area; seventh means for deleting the positional information piece of the first blank area from the positional information in the memory to update the positional information; and eighth means for recording the updated positional information generated by the seventh means on the predetermined area in the optical disc.

A third aspect of this invention provides a method of recording information on an optical disc having a plurality of recording layers including first and second recording layers, the optical disc being of one of a recordable type and a rewritable type. The method comprises the steps of applying a laser beam to the second recording layer through a used area in the first recording layer to record arbitrary information on at least a part of the second recording layer, wherein the used area in the first recording layer has been used for at least one of information recording and data recording; generating positional information of a blank area in the second recording layer which occurs due to the presence of an unused area in the first recording layer, the blank area adjoining the unused area; and recording the generated positional information on a predetermined area in the optical disc.

A fourth aspect of this invention is based on the third aspect thereof, and provides a method wherein the positional-information generating step comprises generating positional information including positional information pieces of one or more blank areas inclusive of first and second blank areas in the second recording layer which occur due to the presence of first and second unused areas in the first recording layer respectively, the first and second blank areas adjoining the first and second unused areas respectively. The method further comprises the steps of storing the generated positional information in a memory; recording an arbitrary information signal on the first unused area to change the first unused area to a used area; recording a predetermined signal on the first blank area to change the first blank area to a used area after the arbitrary information signal is recorded on the first unused area; deleting the positional information piece of the first blank area from the positional information in the memory to update the positional information; and recording the updated positional information on the predetermined area in the optical disc.

A fifth aspect of this invention provides a computer program for recording information on an optical disc having a plurality of recording layers including first and second recording layers, the optical disc being of one of a recordable type and a rewritable type. The computer program enables a computer system to execute the steps of applying a laser beam to the second recording layer through a used area in the first recording layer to record arbitrary information on at least a part of the second recording layer, wherein the used area in the first recording layer has been used for at least one of information recording and data recording; generating positional information of a blank area in the second recording layer which occurs due to the presence of an unused area in the first recording layer, the blank area adjoining the unused area; and recording the generated positional information on a predetermined area in the optical disc.

A sixth aspect of this invention is based on the fifth aspect thereof, and provides a computer program wherein the positional-information generating step comprises generating positional information including positional information pieces of one or more blank areas inclusive of first and second blank areas in the second recording layer which occur due to the presence of first and second unused areas in the first recording layer respectively, the first and second blank areas adjoining the first and second unused areas respectively. The computer program enables the computer system to further execute the steps of storing the generated positional information in a memory; recording an arbitrary information signal on the first unused area to change the first unused area to a used area; recording a predetermined signal on the first blank area to change the first blank area to a used area after the arbitrary information signal is recorded on the first unused area; deleting the positional information piece of the first blank area from the positional information in the memory to update the positional information; and recording the updated positional information on the predetermined area in the optical disc.

A seventh aspect of this invention provides an optical disc of one of a recordable type and a rewritable type for storing information which has a plurality of recording layers including first and second recording layers, wherein a laser beam is applied to the second recording layer through a used area in the first recording layer to record arbitrary information on at least a part of the second recording layer, and the used area in the first recording layer has been used for at least one of information recording and data recording, the optical disc having a predetermined area on which positional information is recorded, the positional information being of a blank area in the second recording layer which occurs due to the presence of an unused area in the first recording layer, the blank area adjoining the unused area.

An eighth aspect of this invention is based on the seventh aspect thereof, and provides an optical disc wherein there is positional information including positional information pieces of one or more blank areas inclusive of first and second blank areas in the second recording layer which occur due to the presence of first and second unused areas in the first recording layer respectively, the first and second blank areas adjoining the first and second unused areas respectively; the positional information piece of the first blank area is deleted from the positional information to update the positional information; and the updated positional information is recorded on the predetermined area.

A ninth aspect of this invention is based on the first aspect thereof, and provides an apparatus wherein the third means comprises means for recording the positional information sequentially on the recording layers in an order from a recording layer nearest an optical pickup to a recording layer farthest therefrom.

A tenth aspect of this invention is based on the third aspect thereof, and provides a method wherein the recording step comprises recording the generated positional information sequentially on the recording layers in an order from a recording layer nearest an optical pickup to a recording layer farthest therefrom.

An eleventh aspect of this invention is based on the fifth aspect thereof, and provides a computer program wherein the recording step comprises recording the generated positional information sequentially on the recording layers in an order from a recording layer nearest an optical pickup to a recording layer farthest therefrom.

A twelfth aspect of this invention is based on the seventh aspect thereof, and provides an optical disc wherein the positional information is recorded sequentially on the recording layers in an order from a recording layer nearest an optical pickup to a recording layer farthest therefrom.

This invention has advantages as follows. In this invention, an optical disc has a plurality of recording layers including first and second recording layers. A laser beam is applied to the second recording layer through a used area in the first recording layer to record arbitrary information on at least a part of the second recording layer. The used area in the first recording layer has been used for information recording. Positional information is generated. The generated positional information is of a blank area in the second recording layer which occurs due to the presence of an unused area in the first recording layer. The blank area adjoins the unused area. The generated positional information is recorded on a predetermined area in the optical disc. The positional information of the blank area is reproduced from the predetermined area in the optical disc. The presence/absence of the blank area and the position of the blank area can be detected by referring to the reproduced positional information. Therefore, at the time of closing borders or finalizing the data recording on the optical disc, it is unnecessary to search for a blank area again. Accordingly, a time taken to close borders or finalize the data recording on the optical disc can be shortened, and an enhanced convenience is available.

In this invention, positional information includes positional information pieces of at least first and second blank areas in the second recording layer which occur due to the presence of first and second unused areas in the first recording layer respectively. The first and second blank areas adjoin the first and second unused areas respectively. A memory stores the positional information. An arbitrary information signal is recorded on the first unused area to change the first unused area to a used area. A predetermined signal is recorded on the first blank area to change the first blank area to a used area after the arbitrary information signal is recorded on the first unused area. The positional information piece of the first blank area is deleted from the positional information in the memory to update the positional information after the predetermined signal is recorded on the first blank area. The updated positional information is recorded on the predetermined area in the optical disc. Accordingly, blank areas in the latest conditions can be accurately managed by referring to the updated positional information.

BRIEF DESCRIPTION OF THE DRAWINGS

FIG. 8 is a sectional diagram of the optical disc in FIG. 6 which is in a state occurring at a first stage.

FIG. 9 is a sectional diagram of the optical disc in FIG. 6 which is in a state occurring at a second stage following the first stage.

FIG. 10 is a sectional diagram of the optical disc in FIG. 6 which is in a state occurring at a third stage following the second stage.

FIG. 11 is a sectional diagram of the optical disc in FIG. 6 which is in a state occurring at a fourth stage following the third stage.

FIG. 12 is a flowchart of a first portion of a control program for a system controller in FIG. 6.

DETAILED DESCRIPTION OF THE INVENTION

Prior-art recording mediums and related prior-art drive apparatuses will be explained below for a better understanding of this invention.

Figure 1:
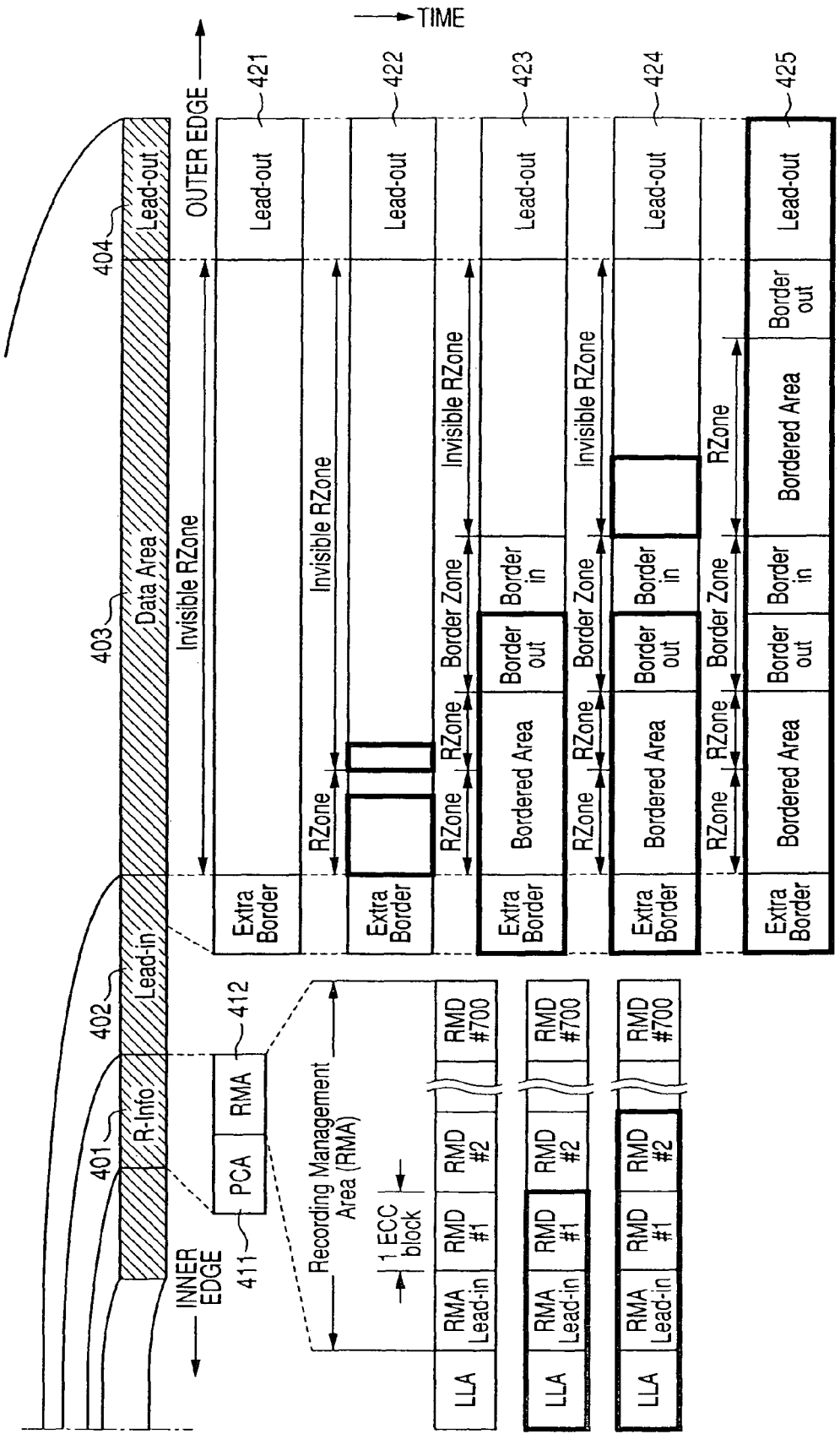
FIG. 1 is a diagram of a first prior-art DVD-R.

With reference to FIG. 1, a first prior-art DVD-R has a recording area divided into an R-information area 401, a lead-in area 402, a data area 403, and a lead-out area 404 which are successively arranged in that order as viewed in a radial direction from the inner circumferential disc edge toward the outer circumferential disc edge.

The R-information area 401 consists of a power calibration area (PCA) 411 and a recording management area (RMA) 412. The PCA 411 extends inward of the RMA 412. The data area 403 is assigned to user data. The lead-in area 402 and the lead-out area 404 are used as buffers for absorbing overruns of a recording and reproducing head (an optical pickup) of a first prior-art disc drive apparatus. A border-in area and a border-out area or border-in areas and border-out areas in the data area 403 also serve as buffers for absorbing overruns of the recording and reproducing head.

An outer portion of the lead-in area 402 which adjoins the data area 403 is called an extra-border zone, and has a function similar to that of the border-in area. A portion of the data area 403 which is not clearly reserved for data recording is called an invisible R-zone. In general, "R-zone" is also referred to as "Rzone".

In FIG. 1, the reference numeral 421 denotes the extra-border zone, the data area 403, and the lead-out area 404 which are in their states occurring when the DVD-R is virgin. The whole of the data area 403 forms the invisible R-zone in the virgin DVD-R.

Contents data such as audio data representing one music tune, audio visual data representing one drama, or computer data representing one file can be recorded on the DVD-R. When a portion of the data area 403 is reserved for contents data to be recorded, the head (the inner edge) of the invisible R-zone (Rzone) in the data area 403 is formed with an R-zone as denoted by the reference numeral 422 in FIG. 1. The contents data can be recorded on the R-zone from its starting edge (its inner edge). In the case where the size of the contents data is unknown, the contents data can be recorded on the invisible R-zone from its starting edge (its inner edge).

To place a DVD-R having recorded contents data in a state where the recorded contents data can be reproduced by a first prior-art DVD player, it is necessary that an area to be mainly accessed and buffer areas located at the two sides of the area to be mainly accessed are set as used areas. This is because the first prior-art DVD player can not read out cutting information from a DVD-R, and uses only pit information recorded on a land of the DVD-R to reproduce recorded data from the DVD-R. When an unused area remains in a reserved R-zone, padding data of "0" is recorded on the unused area so that the unused area can be recognized as a used area. This procedure is referred as the closing of an R-zone. In addition, as denoted by the reference numeral 423 in FIG. 1, prescribed data is recorded on the extra-border zone and a border-out area between which a bordered area, that is, a used R-zone, is sandwiched. This procedure is referred as the closing of borders.

An area extending outward of and adjacently to the border-out area is kept empty as a border-in area for user data to be recorded next. Thus, as denoted by the reference numeral 423 in FIG. 1, an updated invisible R-zone starts from a position immediately outward of the border-in area. The border-out area and the border-in area which are adjacent to each other are collectively referred to as a border zone.

Contents data can be additionally recorded on the DVD-R. Specifically, as denoted by the reference numeral 424 in FIG. 1, the contents data is recorded on the invisible R-zone from its starting edge (its inner edge). When the recording of all contents data on the DVD-R has been completed, prescribed data is recorded on the lead-out area 404 in addition to performing the closing of the borders as denoted by the reference numeral 425 in FIG. 1. This procedure is referred to as the finalization of the data recording on the DVD-R or simply the finalization of the DVD-R. No more contents data can be additionally recorded on a DVD-R which has been finalized.

The recording management area (RMA) 412 is assigned to information for managing changes in the recording states of the lead-in area 402, the data area 403, and the lead-out area 404. The RMA 412 has an RMA lead-in section representing the start of the RMA 412, and a remaining section extending outward of the RMA lead-in section and assigned to recording management data (RMD). The RMA 412 is immediately preceded by a linking loss area (LLA) which acts as a runway to establish PLL synchronization or frame synchronization for data reproduction.

Regarding a DVD-R, a set of error correction code signals is calculated for every ECC block. The RMD in the RMA 412 is divided into segments corresponding to ECC blocks respectively. The RMD is management information representing the recording state of the related DVD-R which occurs at the time of the recording of user data on the data area 403. For example, immediately before a DVD-R is ejected from the first prior-art disc drive apparatus, signals representing the present position of each border zone and the present position of each R-zone are recorded as an RMD block (RMD segment) on the DVD-R. RMD blocks (RMD segments) in the RMA 412 are numbered #1, #2, . . . . There can be up to 700 RMD blocks (RMD segments) in the RMA 412. The RMD blocks (RMD segments) are successively arranged in the RMA 412 in a manner such that the newest RMD block (RMD segment) occupies a position nearest the lead-in area 402.

Thus, the RMD is essential information representing the recording state of the related DVD-R. In the event that the RMD fails to be correctly reproduced, it is difficult to additionally record contents data on the DVD-R. One way to enhance the reliability of RMD is disclosed in Japanese patent application publication number P2002-352522A (corresponding to U.S. patent application publication number US-2002-136134-A1).

Figure 2:
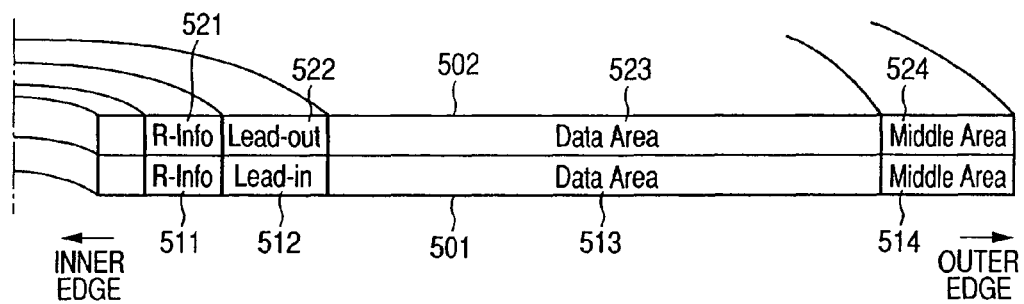
FIG. 2 is a diagram of a second prior-art DVD-R which is of a two-layer single-sided type.

FIG. 2 shows a second prior-art DVD-R which is of a two-layer single-sided type. The prior-art DVD-R of FIG. 2 has a laminated structure including a first recording layer 501 and a second recording layer 502. The first recording layer 501 is closer to an optical pickup (a recording and reproducing head) of a second prior-art disc drive apparatus than the second recording layer 502 is.

The first recording layer 501 is divided into an R-information area 511, a lead-in area 512, a data area 513, and a middle area 514 which are successively arranged in that order as viewed along a radial direction from the inner circumferential disc edge toward the outer circumferential disc edge. The second recording layer 502 is divided into an R-information area 521, a lead-out area 522, a data area 523, and a middle area 524 which are successively arranged in that order as viewed along a radial direction from the inner circumferential disc edge toward the outer circumferential disc edge.

The first recording layer 501 in the prior-art DVD-R of FIG. 2 is similar to the recording layer in the prior-art DVD-R of FIG. 1 except that the middle area 514 replaces the lead-out area 404 (see FIG. 1). The second recording layer 502 is similar to the first recording layer 501 except that the lead-out area 522 replaces the lead-in area 512. The first recording layer 501 is scanned in a direction from the inner circumferential disc edge toward the outer circumferential disc edge during the recording of data thereon. The second recording layer 502 is scanned in a direction from the outer circumferential disc edge toward the inner circumferential disc edge during the recording of data thereon.

Figure 3:
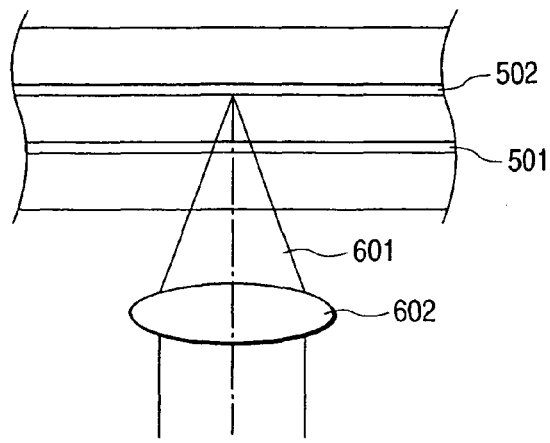
FIG. 3 is a sectional diagram of the second prior-art DVD-R, an objective lens in an optical pickup, and a laser beam.

With reference to FIG. 3, the optical pickup of the second prior-art disc drive apparatus has an objective lens 602 through which a laser beam 601 emitted from a light source in the optical pickup passes. During the recording of data on the second recording layer 502, the objective lens 602 focuses the laser beam 601 on the second recording layer 502. In this case, the laser beam 601 passes through the objective lens 602 and the first recording layer 501 before reaching the second recording layer 502. Thus, conditions of the recording of data on the second recording layer 502 depend on whether a portion of the first recording layer 501 through which the laser beam 601 passes is used or unused, that is, whether or not the portion of the first recording layer 501 already has recorded data.

In the case where the laser beam 601 is controlled to always pass through a used portion of the first recording layer 501 during the recording of data on the second recording layer 502, conditions of the data recording can be constant. In this case, as shown in FIG. 3, the diameter of the laser beam 601 in the first recording layer 501 is greater than that at the second recording layer 502. Therefore, a signal recordable area in the second recording layer 502 is narrow relative to a used area in the first recording layer 501. The signal recordable area in the second recording layer 502 is narrower when errors (tolerance) in the structures of the first and second recording layers 501 and 502 are considered.

Figure 4:
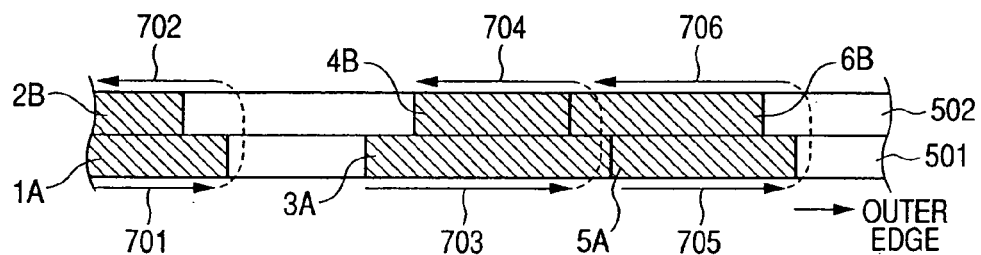
FIG. 4 is a sectional diagram of the second prior-art DVD-R which is in a first state.

FIG. 4 shows a prior-art signal recording procedure in which the laser beam 601 is controlled to always pass through a used portion of the first recording layer 501 during the recording of data on the second recording layer 502.

With reference to FIG. 4, data is recorded on a first portion 1A of the first recording layer 501 while the first recording layer 501 is scanned along a direction 701 from the inner circumferential disc side toward the outer circumferential disc side. The data recording changes the first portion 1A of the first recording layer 501 to a used portion. Subsequently, data is recorded on a first portion 2B of the second recording layer 502 while the second recording layer 502 is scanned along a direction 702 from the outer circumferential disc side toward the inner circumferential disc side. The data recording changes the first portion 2B of the second recording layer 502 to a used portion. The first portion 2B of the second recording layer 502 is located above the first portion 1A of the first recording layer 501. During the data recording on the first portion 2B of the second recording layer 502, the laser beam continues to pass through the first portion 1A, that is, the used portion, of the first recording layer 501. The first portion 1A of the first recoding layer 501 and the first portion 2B of the second recording layer 502 constitute a used R-zone.

Thereafter, data is recorded on a second portion 3A of the first recording layer 501 while the first recording layer 501 is scanned along a direction 703 from the inner circumferential disc side toward the outer circumferential disc side. The data recording changes the second portion 3A of the first recording layer 501 to a used portion. The second portion 3A of the first recording layer 501 is located outward of the first portion 1A thereof. There is an unused area in the first recording layer 501 between the first and second portions 1A and 3A thereof. Subsequently, data is recorded on a second portion 4B of the second recording layer 502 while the second recording layer 502 is scanned along a direction 704 from the outer circumferential disc side toward the inner circumferential disc side. The data recording changes the second portion 4B of the second recording layer 502 to a used portion. The second portion 4B of the second recording layer 502 is located above the second portion 3A of the first recording layer 501. During the data recording on the second portion 4B of the second recording layer 502, the laser beam continues to pass through the second portion 3A, that is, the used portion, of the first recording layer 501. The second portion 3A of the first recording layer 501 and the second portion 4B of the second recording layer 502 constitute a used R-zone.

Thereafter, data is recorded on a third portion 5A of the first recording layer 501 while the first recording layer 501 is scanned along a direction 705 from the inner circumferential disc side toward the outer circumferential disc side. The data recording changes the third portion 5A of the first recording layer 501 to a used portion. The third portion 5A of the first recording layer 501 is located immediately outward of the second portion 3A thereof. Subsequently, data is recorded on a third portion 6B of the second recording layer 502 while the second recording layer 502 is scanned along a direction 706 from the outer circumferential disc side toward the inner circumferential disc side. The data recording changes the third portion 6B of the second recording layer 502 to a used portion. The third portion 6B of the second recording layer 502 is located above the second and third portions 3A and 5A of the first recording layer 501. During the data recording on the third portion 6B of the second recording layer 502, the laser beam continues to pass through one of the second and third portions 3A and 5A, that is, the used portions, of the first recording layer 501. The third portion 5A of the first recording layer 501 and the third portion 6B of the second recording layer 502 constitute a used R-zone.

Figure 5:
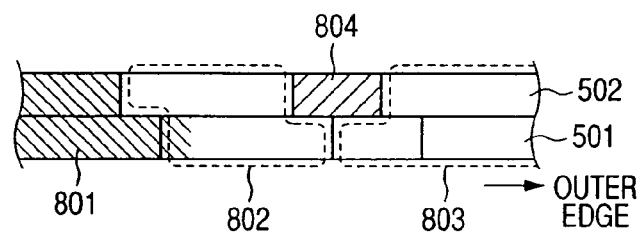
FIG. 5 is a sectional diagram of the second prior-art DVD-R which is in a second state.

With reference to FIG. 5, data is recorded on first portions of the first and second recording layers 501 and 502 to form a used R-zone 801, and then an R-zone 802 is reserved which extends immediately outward of the used R-zone 801, and which has second portions of the first and second recording layers 501 and 502. There is an invisible R-zone 803 extending immediately outward of the reserved R-zone 802 and having third portions of the first and second recording layers 501 and 502.

In the case where data is recorded on only a part of the first recording layer 501 in the reserved R-zone 802 and hence an unused part remains in the first recording layer 501 in the reserved R-zone 802, there occurs a blank area 804 in the second recording layer 502 between the reserved R-zone 802 and the invisible R-zone 803. The data recording on the blank area 804 is allowed provided that the data recording on the first recording layer 501 in the reserved R-zone 802 and the invisible R-zone 803 has been completed. This is because the laser beam is required to always pass through a used portion of the first recording layer 501 during the recording of data on any part of the second recording layer 502. Thus, during the data recording on the invisible R-zone 803, the blank area 804 remains unaccessed.

The blank area 804 can not be handled in a way similar to the way of handling another R-zone for the following reasons 1) and 2).

1) The blank area 804 is narrow, and has only a small recording capacity. Therefore, in some cases, the blank area 804 can not provide a data area (CDA) having such a recorded information amount as to satisfy a jump performance model which maintains the playback of information even during a seek time interval to implement the continuous reproduction of information. It should be noted that the information played back during the seek time interval has been reproduced and memorized immediately before the seek time interval. The jump performance model is indicated in, for example, unpublished documents "DVD Specifications for Rewritable/Re-recordable Discs Part 3: VIDEO RECORDINGS, Version 1.9, September 1999, DVD Forum, VRX-G1".

2) It is difficult to manage a timing at which data recording is allowed. As previously mentioned, the data recording on the blank area 804 is allowed provided that the data recording on the first recording layer 501 in the reserved R-zone 802 and the invisible R-zone 803 has been completed. Therefore, in almost all cases, padding data of "0" is recorded on the blank area 804 at the time of the closing of borders, at the time of the finalization of the DVD-R, or at a recordable timing. It is conceivable to load the blank area 804 with computer data or video data rather than the padding data.

Japanese patent application publication number P2002-352522A (corresponding to U.S. patent application publication number US-2002-136134-A1) discloses a typical prior-art apparatus for recording information on a DVD-R. The prior-art apparatus in Japanese application P2002-352522A is designed for a DVD-R having only one recording layer. In an assumed case where the prior-art apparatus is applied to a two-layer single-sided DVD-R, it may take a long time to search for a blank area at the time of closing a border in the DVD-R or finalizing the data recording thereon.

First Embodiment

Figure 6:
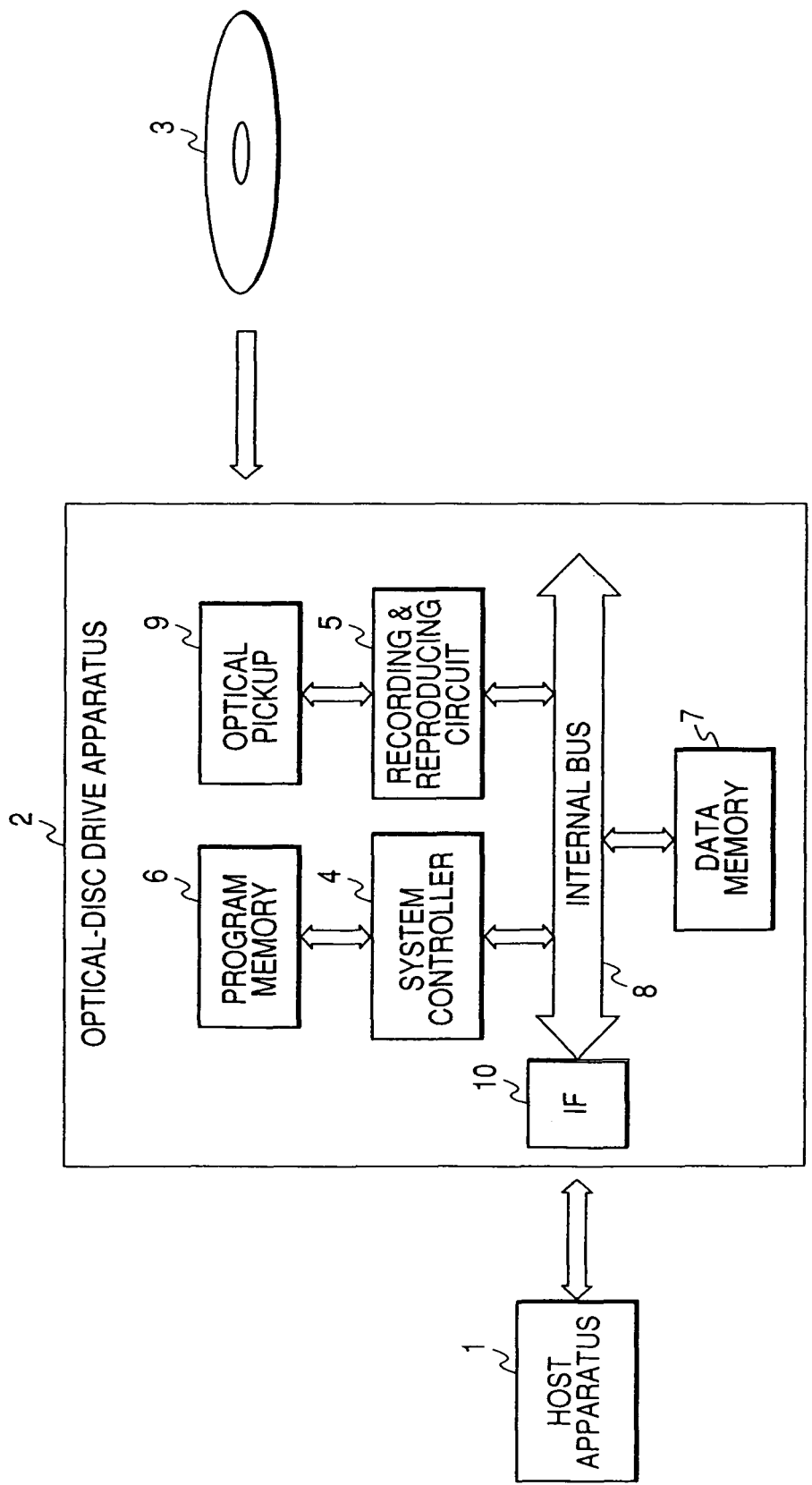
FIG. 6 is a block diagram of an information recording and reproducing system including a host apparatus, an optical-disc drive apparatus, and an optical disc according to a first embodiment of this invention.

FIG. 6 shows an information recording and reproducing system including a host apparatus 1, an optical-disc drive apparatus 2, and an optical disc 3. The optical-disc drive apparatus 2 and the optical disc 3 are in a first embodiment of this invention. The host apparatus 1 and the optical-disc drive apparatus 2 are connected with each other. The optical disc 3 can be inserted into and ejected from the body of the optical-disc drive apparatus 2.

The optical disc 3 is of a two-layer single-sided type. The optical disc 3 uses a digital versatile disc recordable (DVD-R). The optical disc 3 is formed with a central opening, and thus has an inner circumferential edge in addition to an outer circumferential edge.

The host apparatus 1 includes, for example, a personal computer. The host apparatus 1 can instruct the optical-disc drive apparatus 2 to record information on the optical disc 3 or reproduce information therefrom. It should be noted that the host apparatus 1 and the optical-disc drive apparatus 2 may be located in a common casing. For example, the host apparatus 1 and the optical-disc drive apparatus 2 are combined to form an optical-disc recorder or an optical-disc recordable player.

The optical-disc drive apparatus 2 has not only the function of recording information on the optical disc 3 but also the function of reproducing information therefrom. The optical-disc drive apparatus 2 includes a system controller 4, a recording and reproducing circuit 5, a program memory 6, a data memory 7, an internal bus 8, an optical pickup (a recording and reproducing head) 9, and an interface 10.

The system controller 4, the recording and reproducing circuit 5, the data memory 7, and the interface 10 are bidirectionally connected by the internal bus 8. The program memory 6 is connected with the system controller 4. The optical pickup 9 is connected with the recording and reproducing circuit 5. The optical pickup 9 can optically access the optical disc 3 which is placed at its normal position within the body of the optical-disc drive apparatus 2. The interface 10 is connected with the host apparatus 1.

The system controller 4 includes a signal processor or a CPU. The system controller 4 acts to control the whole of the optical-disc drive apparatus 2 according to a control program (a computer program). The recording and reproducing circuit 5 implements writing and reading information in and from the optical disc 3 via the optical pickup 9. The program memory 6 stores the control program for the system controller 4. Data to be recorded on the optical disc 3, data reproduced from the optical disc 3, and management information can be written into and read out from the data memory 7, and temporarily stored therein. The optical pickup 9 optically writes and reads data into and from the optical disc 3 which is placed at its normal position within the body of the optical-disc drive apparatus 2. The interface 10 connects the host apparatus 1 and the internal bus 8.

The recording and reproducing circuit 5 implements writing and reading contents information in and from the optical disc 3 via the optical pickup 9. In addition, the recording and reproducing circuit 5 implements writing and reading management information in and from the optical disc 3 via the optical pickup 9. The system controller 4 writes and reads management information into and from the data memory 7 via the internal bus 8. Furthermore, the system controller 4 controls the recording and reproducing circuit 5 to write and read management information into and from R-information areas in the optical disc 3 via the optical pickup 9.

The system controller 4, the recording and reproducing circuit 5, the program memory 6, the data memory 7, the internal bus 8, and the interface 10 compose a computer system which operates according to the control program stored in the program memory 6.

The optical disc 3 has the structure same as that in FIG. 2. Thus, the optical disc 3 includes a laminate of a first recording layer 501 and a second recording layer 502 (see FIG. 2). The first recording layer 501 has an R-information area 511 (see FIG. 2). The second recording layer 502 has an R-information area 521 (see FIG. 2). The R-information areas 511 and 521 align axially with respect to the optical disc 3. Each of the R-information areas 511 and 521 includes a recording management area (RMA) assigned to recording management data (RMD). Recording management data is also referred to as management information. The RMD in each RMA is divided into segments corresponding to ECC blocks respectively. The RMD blocks (RMD segments) are successively arranged in the RMA of the R-information area 511 in a manner such that the newest RMD block (RMD segment) occupies an outermost position. The RMD blocks (RMD segments) are successively arranged in the RMA of the R-information area 521 in a manner such that the newest RMD block (RMD segment) occupies an innermost position.

At a prescribed timing such as a timing immediately before the optical disc 3 is ejected from the body of the optical-disc drive apparatus 2, one ECC block of management information is recorded on the R-information area 511 (see FIG. 2) in the first recording layer 501 of the optical disc 3 while the R-information area 511 is scanned by the optical pickup 9 along a direction from the inner circumferential disc edge toward the outer circumferential disc edge. It should be noted that one ECC block consists of 16 sectors. After the R-information area 511 has been fully used, the R-information area 521 (see FIG. 2) in the second recording layer 502 of the optical disc 3 is used instead of the R-information area 511. Specifically, at a prescribed timing such as a timing immediately before the optical disc 3 is ejected from the body of the optical-disc drive apparatus 2, one ECC block of management information is recorded on the R-information area 521 while the R-information area 521 is scanned by the optical pickup 9 along a direction from the outer circumferential disc edge toward the inner circumferential disc edge.

Figure 7:
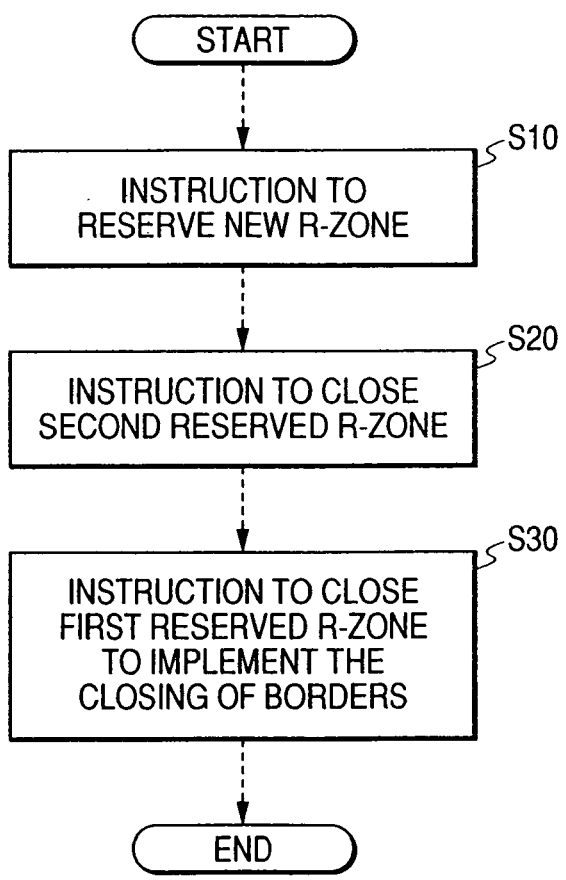
FIG. 7 is a diagram of a sequence of instructions issued from the host apparatus to the optical-disc drive apparatus in FIG. 6.

With reference to FIG. 7, an example of instructions sequentially issued from the host apparatus 1 to the optical-disc drive apparatus 2 includes an instruction S10 to reserve a new R-zone, an instruction S20 to close a second reserved R-zone, and an instruction S30 to close a first reserved R-zone to implement the closing of borders. In general, "R-zone" is also referred to as "Rzone". The instruction S30 may be to finalize the data recording on the optical disc 3. The moment of the issue of the instruction S10 is prior to the moment of the issue of the instruction S20. The moment of the issue of the instruction S20 is prior to the moment of the issue of the instruction S30.

With reference to FIG. 8, a used R-zone (Rzone) 100 is formed in the first recording layer 501 and the second recording layer 502 in the data area of the optical disc 3. The used R-zone means a data-recorded R-zone, that is, an R-zone having recorded data. In the case where the host apparatus 1 issues the optical-disc drive apparatus 2 an instruction to reserve a new R-zone (that is, the instruction S10 in FIG. 7), the optical-disc drive apparatus 2 operates as follows.

The system controller 4 in the optical-disc drive apparatus 2 receives the instruction to reserve a new R-zone from the host apparatus 1 via the interface 10 and the internal bus 8. The system controller 4 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3. The newest RMD block (RMD segment) represents the position of the used R-zone 100.

In the case where RMD is stored only in the R-information area 511, an RMD block (RMD segment) at an outermost position is the newest one. In the case where RMD is stored in both the R-information areas 511 and 521, an RMD block (RMD segment) at an innermost position in the R-information area 521 is the newest one.

Subsequently, the system controller 4 provides a first reserved R-zone 101a in an invisible R-zone of the optical disc 3 in response to the newest RMD block (RMD segment). As shown in FIG. 8, the first reserved R-zone 101a extends in a place outward of and adjacent to the used R-zone 100.

As a result, there occurs a first blank area 103a (see FIG. 8) in the second recording layer 502 of the optical disc 3. As shown in FIG. 8, the first blank area 103a extends between the second recording layer 502 defining the outer edge of the first reserved R-zone 101a and the second recording layer 502 defining the inner edge of an invisible R-zone 102 immediately outward of the first reserved R-zone 101a. Data recording on the first blank area 103a is allowed provided that data recording on the first recording layer 501 in the first reserved R-zone 101a and the invisible R-zone 102 has been completed. The first blank area 103a adjoins the first recording layer 501 in the first reserved R-zone 101a and the invisible R-zone 102.

Then, the system controller 4 calculates the start sector number and the end sector number of the first blank area 103a. The start sector number and the end sector number mean the sector-based start address and the sector-based end address, respectively. The data memory 7 has a section assigned to RMD having pure RMD components and other components representing a blank-area table. This section of the data memory 7 is referred to as the RMD recording section. The system controller 4 accesses the data memory 7, and adds the calculated start address number and the calculated end address number of the first blank area 103a to the blank-area table to update the RMD in the data memory 7 and generate a new RMD block (RMD segment). The system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3.

FIG. 12 is a flowchart of a portion (a subroutine) of the control program for the system controller 4 which relates to the above-mentioned operation of the optical-disc drive apparatus 2.

With reference to FIG. 12, a first step S11 of the program portion receives the instruction to reserve a new R-zone from the host apparatus 1.

A step S12 following the step S11 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3.

A step S13 subsequent to the step S12 provides a first reserved R-zone 101*a* in an invisible R-zone of the optical disc 3 in response to the newest RMD block (RMD segment). As a result, there occurs a first blank area 103*a* (see FIG. 8) in the second recording layer 502 of the optical disc 3.

A step S14 following the step S13 calculates the start sector number and the end sector number of the first blank area 103*a*.

A step S15 subsequent to the step S14 accesses the data memory 7, and adds the calculated start address number and the calculated end address number of the first blank area 103*a* to the blank-area table to update the RMD in the data memory 7 and generate a new RMD block (RMD segment). The step S15 controls the data memory 7 to send the updated RMD (the new RMD block or segment) to the recording and reproducing circuit 5. The step S15 controls the optical pickup 9 via the internal bus 8 and the recording and reproducing circuit 5, thereby writing the updated RMD (the new RMD block or segment) into the RMA in the R-information area 511 or 521 of the optical disc 3. After the step S15, the current execution cycle of the program portion ends and then the program returns to a main routine.

It should be noted that the optical disc 3 may be ejected from the body of the optical-disc drive apparatus 2 after the writing of the updated RMD into the optical disc 3.

Figure 15:
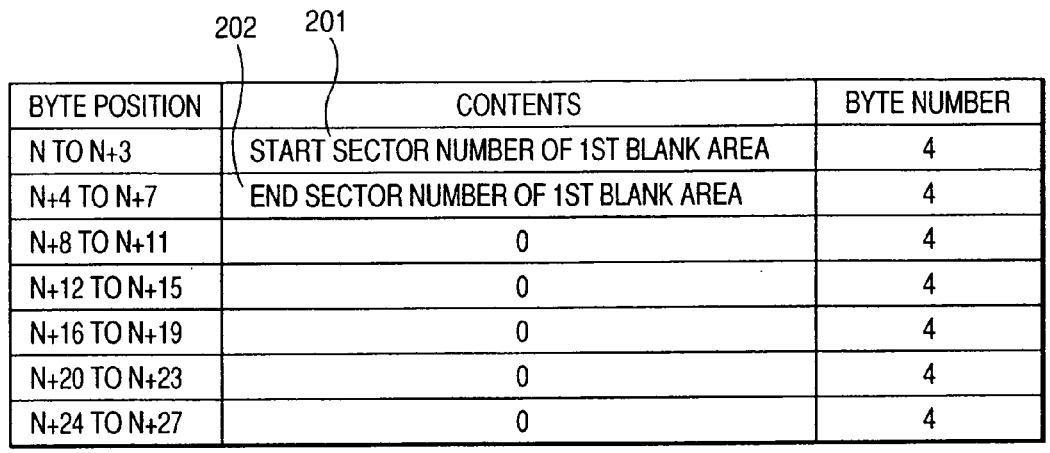
FIG. 15 is a diagram of a blank-area table in a first state which is represented by management information stored in a data memory in FIG. 6 and recorded on the optical disc in FIG. 6.

FIG. 15 shows an example of the contents of the blank-area table provided in the data memory 7. As shown in FIG. 15, a 4-byte signal representing the start sector number of the first blank area 103*a* is stored in a field storage location 201 from a byte position of "N" to a byte position of "N+3" in the blank-area table. A 4-byte signal representing the end sector number of the first blank area 103*a* is stored in a field storage location 202 from a byte position of "N+4" to a byte position of "N+7" in the blank-area table. Other field storage locations in the blank-area table are loaded with data of "0".

With reference to FIG. 9, in the case where a certain amount of data is recorded on the invisible R-zone 102 and then an R-zone is reserved, a used R-zone 104 is formed in the invisible R-zone 102 and a second reserved R-zone 105*a* and an invisible R-zone 106 are successively formed.

The used R-zone 104 extends outward of and adjacently to the first reserved R-zone 101*a* and the first blank area 103*a*. The second reserved R-zone 105*a* extends outward of and adjacently to the used R-zone 104. The invisible R-zone 106 extends outward of the second reserved R-zone 105*a*.

In the first recording layer 501, the invisible R-zone 106 adjoins the second reserved R-zone 105*a*. In addition, there is a second blank area 107*a* in the second recording layer 502 of the optical disc 3. The second blank area 107*a* extends between the second recording layer 502 defining the outer edge of the second reserved R-zone 105*a* and the second recording layer 502 defining the inner edge of the invisible R-zone 106. Data recording on the second blank area 107*a* is allowed provided that data recording on the first recording layer 501 in the second reserved R-zone 105*a* and the invisible R-zone 106 has been completed. The second blank area 107*a* adjoins the first recording layer in the second reserved R-zone 105*a* and the invisible R-zone 106.

In this case, the optical-disc drive apparatus 2 operates in a way similar to the previously-mentioned operation concerning the R-zone reservation to form the first reserved R-zone 101*a*. Specifically, the system controller 4 calculates the start sector number and the end sector number of the second blank area 107*a*. The system controller 4 accesses the data memory 7, and adds the calculated start address number and the calculated end address number of the second blank area 107*a* to the blank-area table to update the RMD in the data memory 7 and generate a new RMD block (RMD segment). The system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3.

Figure 16:
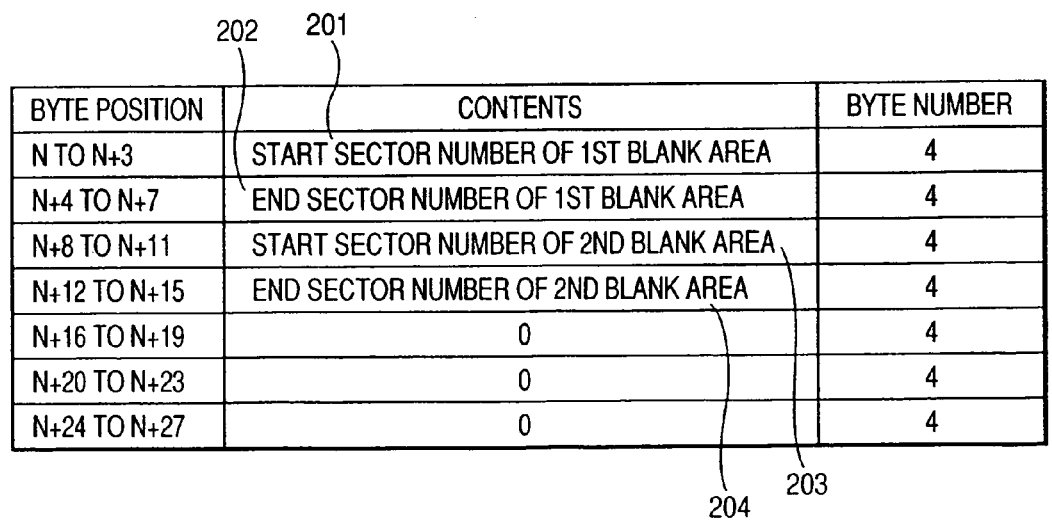
FIG. 16 is a diagram of the blank-area table in a second state.

FIG. 16 shows a related example of the contents of the blank-area table provided in the data memory 7. As shown in FIG. 16, a 4-byte signal representing the start sector number of the second blank area 107*a* is stored in a field storage location 203 from a byte position of "N+8" to a byte position of "N+11" in the blank-area table. A 4-byte signal representing the end sector number of the second blank area 107*a* is stored in a field storage location 204 from a byte position of "N+12" to a byte position of "N+15" in the blank-area table.

With reference to FIGS. 9 and 10, the optical-disc drive apparatus 2 records a desired information signal (data) on a part of the second reserved R-zone 105*a* via the optical pickup 9. As a result, the second reserved R-zone 105*a* has an unused part. The unused part means a part which has not been used for data recording yet. The desired information signal may be recorded on the whole of the second reserved R-zone 105*a*. In addition, the optical-disc drive apparatus 2 records data on a part of the invisible R-zone 106 to change the invisible R-zone 106 to an incomplete or invisible R-zone 108. In the case where the host apparatus 1 issues the optical-disc drive apparatus 2 an instruction to close the second reserved R-zone 105*a* (that is, the instruction S20 in FIG. 7), the optical-disc drive apparatus 2 implements the closing of the second reserved R-zone 105*a*. Specifically, the optical-disc drive apparatus 2 writes padding data of "0" (that is, ineffective data) into the unused part of the second reserved R-zone 105*a*. As a result, the second reserved R-zone 105*a* is closed, and changes to a used R-zone 105*b* (see FIG. 10).

In more detail, the system controller 4 in the optical-disc drive apparatus 2 receives the instruction to close the second reserved R-zone 105*a* from the host apparatus 1 via the interface 10 and the internal bus 8. The system controller 4 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3.

Subsequently, the system controller 4 stores the read-out newest RMD block (RMD segment) into the RMD recording section of the data memory 7. Then, the system controller 4 checks the blank-area table represented by the newest RMD block (RMD segment) in the data memory 7 to decide whether a blank area is present or absent which is allowed to be loaded with data as a result of closing the second reserved R-zone 105*a*.

Specifically, the system controller 4 decides the presence of the second blank area 107*a* which is allowed to be loaded with data as a result of closing the second reserved R-zone 105*a* by the following actions A1, A2, and A3. A1: The system controller 4 recognizes the presence of the second blank area 107*a* from the blank-area table. A2: The system controller 4 ascertains the position of the used part of the first recording layer 501 in the incomplete or invisible R-zone 108. The used part means a data-recorded part, that is, a part having recorded data. A3: The system controller 4 ascertains that the whole of the first recording layer 501 in the second reserved R-zone 105*a* has been used for data recording.

Thereafter, the system controller 4 sends padding data of "0" (that is, ineffective data) to the recording and reproducing circuit 5 and controls the optical pickup 9 via the internal bus 8 and the recording and reproducing circuit 5, thereby writing the padding data of "0" into the second blank area 107a in the optical disc 3. Thus, the second blank area 107a changes to a used area 107b as shown in FIG. 10.

Preferably, the system controller 4 refers to the RMD in the data memory 7 to decide whether or not the second reserved R-zone 105a has been fully used for data recording, that is, whether or not the second reserved R-zone 105a has an unused part. The unused part means a part which has not been used for data recording yet. In the event that the second reserved R-zone 105a has an unused part, the optical-disc drive apparatus 2 writes the padding data of "0" into the second blank area 107a after closing the second reserved R-zone 105a.

In this case, the closing of the second reserved R-zone 105a is performed as follows. The system controller 4 sends padding data of "0" (that is, ineffective data) to the recording and reproducing circuit 5 and controls the optical pickup 9 via the internal bus 8 and the recording and reproducing circuit 5, thereby writing the padding data of "0" into the unused part of the second reserved R-zone 105a. As a result, the second reserved R-zone 105a is closed, and changes to a used R-zone 105b (see FIG. 10). Subsequently, the system controller 4 accesses the data memory 7, and refers to an unclosed-area list represented by the RMD therein. The system controller 4 deletes the second reserved R-zone 105a from the unclosed-area list to update the RMD in the data memory 7 and generate a new RMD block (RMD segment). The system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3. The writing of the updated RMD (the new RMD block or segment) into the RMA may be omitted from this stage.

In the case where the first recording layer 501 in the invisible R-zone 106 is fully unused, the second blank area 107a is not allowed to be loaded with data as a result of closing the second reserved R-zone 105a.

Subsequently, the system controller 4 accesses the data memory 7, and deletes the start address number and the end address number of the second blank area 107a from the blank-area table and moves up information pieces representative of the start address number and the end address number of a later blank area (or later blank areas) in the blank-area table to update the RMD in the data memory 7 and generate a new RMD block (RMD segment). The system controller 4 writes data of "0" into the places in the blank-area table where the moved-up information pieces originally exist. The system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3.

Figure 13:
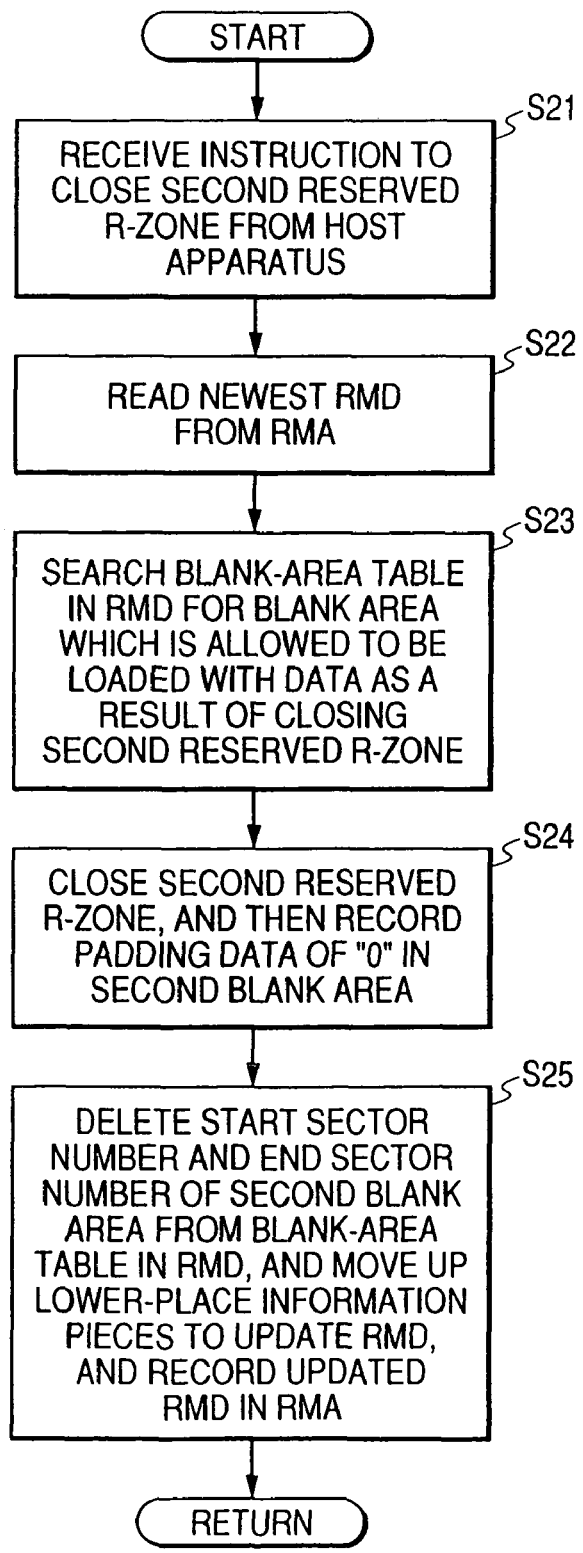
FIG. 13 is a flowchart of a second portion of the control program for the system controller in FIG. 6.

FIG. 13 is a flowchart of a portion (a subroutine) of the control program for the system controller 4 which relates to the above-mentioned operation of the optical-disc drive apparatus 2.

With reference to FIG. 13, a first step S21 of the program portion receives the instruction to close the second reserved R-zone 105a from the host apparatus 1.

A step S22 following the step S21 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3. The step S22 stores the read-out newest RMD block (RMD segment) into the RMD recording section of the data memory 7.

A step S23 subsequent to the step S22 searches the blank-area table represented by the newest RMD block (RMD segment) in the data memory 7 for a blank area which is allowed to be loaded with data as a result of closing the second reserved R-zone 105a. Specifically, the step S23 finds the second blank area 107a which is allowed to be loaded with data as a result of closing the second reserved R-zone 105a.

A step S24 following the step S23 sends padding data of "0" (that is, ineffective data) to the recording and reproducing circuit 5 and controls the optical pickup 9 via the internal bus 8 and the recording and reproducing circuit 5, thereby writing the padding data of "0" into the second blank area 107a in the optical disc 3. Thus, the second blank area 107a changes to a used area 107b as shown in FIG. 10.

Preferably, the step S24 refers to the RMD in the data memory 7 to decide whether or not the second reserved R-zone 105a has been fully used for data recording, that is, whether or not the second reserved R-zone 105a has an unused part. In the event that the second reserved R-zone 105a has an unused part, the step S24 functions to write the padding data of "0" into the second blank area 107a after closing the second reserved R-zone 105a.

In this case, the step S24 implements the closing of the second reserved R-zone 105a as follows. The step S24 sends padding data of "0" (that is, ineffective data) to the recording and reproducing circuit 5 and controls the optical pickup 9 via the internal bus 8 and the recording and reproducing circuit 5, thereby writing the padding data of "0" into the unused part of the second reserved R-zone 105a. As a result, the second reserved R-zone 105a is closed, and changes to a used R-zone 105b. Subsequently, the step S24 accesses the data memory 7, and refers to the unclosed-area list represented by the RMD therein. The step S24 deletes the second reserved R-zone 105a from the unclosed-area list to update the RMD in the data memory 7 and generate a new RMD block (RMD segment). The step S24 controls the data memory 7 to send the updated RMD (the new RMD block or segment) to the recording and reproducing circuit 5. The step S24 controls the optical pickup 9 via the internal bus 8 and the recording and reproducing circuit 5, thereby writing the updated RMD (the new RMD block or segment) into the RMA in the R-information area 511 or 521 of the optical disc 3. The writing of the updated RMD (the new RMD block or segment) into the RMA may be omitted from this stage.

A step S25 subsequent to the step S24 accesses the data memory 7, and deletes the start address number and the end address number of the second blank area 107a from the blank-area table and moves up information pieces representative of the start address number and the end address number of a later blank area (or later blank areas) in the blank-area table to update the RMD in the data memory 7 and generate a new RMD block (RMD segment). The step S25 writes data of "0" into the places in the blank-area table where the moved-up information pieces originally exist. The step S25 controls the data memory 7 to send the updated RMD (the new RMD block or segment) to the recording and reproducing circuit 5.

The step S25 controls the optical pickup 9 via the internal bus 8 and the recording and reproducing circuit 5, thereby writing the updated RMD (the new RMD block or segment) into the RMA in the R-information area 511 or 521 of the optical disc 3. After the step S25, the current execution cycle of the program portion ends and then the program returns to the main routine.

Figures 17, 18:
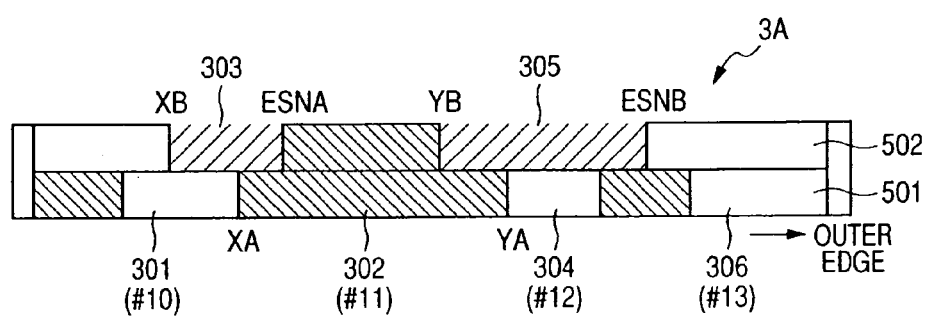
FIG. 17 is a diagram of the blank-area table in a third state.
FIG. 18 is a sectional diagram of an optical disc in a second embodiment of this invention.

FIG. 17 shows a related example of the contents of the blank-area table provided in the data memory 7. The 4-byte signal representing the start sector number of the second blank area 107a and the 4-byte signal representing the end sector number of the second blank area 107a are absent from the blank-area table. As shown in FIG. 17, a 4-byte signal representing the start sector number of a third blank area is stored in a field storage location 205 from a byte position of "N+8" to a byte position of "N+11" in the blank-area table. A 4-byte signal representing the end sector number of the third blank area is stored in a field storage location 206 from a byte position of "N+12" to a byte position of "N+15" in the blank-area table. A 4-byte signal representing the start sector number of a fourth blank area is stored in a field storage location 207 from a byte position of "N+16" to a byte position of "N+19" in the blank-area table. A 4-byte signal representing the end sector number of the fourth blank area is stored in a field storage location 208 from a byte position of "N+20" to a byte position of "N+23" in the blank-area table. In the absence of the third and fourth blank areas, the field storage locations 205, 206, 207, and 208 are loaded with data of "0".

It is unnecessary to fill the second blank area 107a with padding data of "0" at the above-indicated timing. Other data may be recorded on the second blank area 107a at a later timing. In this case, when the data recording on the second blank area 107a has been completed, the start address number and the end address number of the second blank area 107a are deleted from the blank-area table and thus the RMD is updated. It is unnecessary to record other data on the whole of the second blank area 107a at one time. Other data may be recorded on only a part of the second blank area 107a. In this case, the second blank area 107a except the used part is newly registered in the RMD. Specifically, in the blank-area table, the start sector number of the second blank area 107a or the end sector number thereof is updated.

Sometimes the optical disc 3 is ejected from the body of the optical-disc drive apparatus 2 after the updated RMD is recorded on the RMA in the R-information area 511 or 521 of the optical disc 3. In this case, the optical-disc drive apparatus 2 will lose the RMD concerning the present conditions of the optical disc 3. When the optical disc 3 is inserted into the body of the optical-disc drive apparatus 2 again, the newest RMD block (RMD segment) is read out from the RMA in the R-information area 511 or 521 of the optical disc 3. The read-out RMD block (RMD segment) is stored into the data memory 7. As a result, the optical-disc drive apparatus 2 retrieves the RMD concerning the present conditions of the optical disc 3.

In the case where the above-mentioned operation procedures are iterated so that the recording of the desired information signal on the optical disc 3 is completed, the host apparatus 1 issues the optical-disc drive apparatus 2 an instruction to close the first reserved R-zone 101a to implement the closing of a border or an instruction to finalize the data recording on the optical disc 3 (that is, the instruction S30 in FIG. 7). In response to the instruction, the optical-disc drive apparatus 2 operates as follows.

The system controller 4 in the optical-disc drive apparatus 2 receives the instruction to close the first reserved R-zone 101a to implement the closing of a border or the instruction to finalize the data recording on the optical disc 3 from the host apparatus 1 via the interface 10 and the internal bus 8. The system controller 4 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3.

Subsequently, the system controller 4 stores the read-out newest RMD block (RMD segment) into the RMD recording section of the data memory 7. Then, the system controller 4 checks the blank-area table represented by the newest RMD block (RMD segment) in the data memory 7 to decide whether a blank area is present or absent which is allowed to be loaded with data as a result of closing the first reserved R-zone 101a, and whether or not a blank area is present in or absent from another portion of the optical disc 3.

Thereafter, the system controller 4 sends padding data of "0" (that is, ineffective data) to the recording and reproducing circuit 5 and controls the optical pickup 9 via the internal bus 8 and the recording and reproducing circuit 5, thereby writing the padding data of "0" into the first reserved R-zone 101a in the optical disc 3. Subsequently, the system controller 4 accesses the data memory 7, and refers to an unclosed-area list represented by the RMD therein. The system controller 4 deletes the first reserved R-zone 101a from the unclosed-area list to update the RMD in the data memory 7 and generate a new RMD block (RMD segment). The system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3. The writing of the updated RMD (the new RMD block or segment) into the RMA may be omitted from this stage. In this way, the first reserved R-zone 101a is closed, and changes to a used R-zone 101b as shown in FIG. 11. Thus, the first recording layer 501 in the first reserved R-zone 101a has been fully used so that the first blank area 103a is now allowed to be loaded with data.

After the closing of the first reserved R-zone 101a, the system controller 4 sends padding data of "0" (that is, ineffective data) to the recording and reproducing circuit 5 and controls the optical pickup 9 via the internal bus 8 and the recording and reproducing circuit 5, thereby writing the padding data of "0" into the first blank area 103a in the optical disc 3. Thus, the first blank area 103a changes to a used area 103b as shown in FIG. 11. When there is another blank area (or other blank areas) in the optical disc 3, the system controller 4 operates to write the padding data of "0" into the blank area. In FIG. 11, a used R-zone 109 originates from the incomplete or invisible R-zone 108 (see FIG. 10), and is loaded with the desired information signal. It is preferable to form a border-out area (not shown in FIG. 11) in a place outward of the used R-zone 109 and to record prescribed data on the border-out area.

Subsequently, the system controller 4 accesses the data memory 7, and deletes the start address number and the end address number of the first blank area 103a from the blank-area table and moves up information pieces representative of the start address number and the end address number of a later blank area (or later blank areas) in the blank-area table to update the RMD in the data memory 7 and generate a new RMD block (RMD segment). The system controller 4 writes data of "0" into the places in the blank-are table where the moved-up information pieces originally exist. Also in the presence of the other blank area which is filled with the padding data of "0" at this stage, the system controller 4 deletes the start address number and the end address number of the other blank area from the blank-area table and moves up information pieces representative of the start address number and the end address number of a later blank area (or later blank areas) in the blank-area table to update the RMD in the data memory 7 and generate a new RMD block (RMD segment). The system controller 4 writes data of "0" into the places in the blank-area table where the moved-up information pieces originally exist.

Thereafter, the system controller 4 checks the blank-area table to detect whether the uppermost field storage location in the blank-area table is filled with data of "0". When the uppermost field storage location in the blank-area table is filled with data of "0", the system controller 4 decides the absence of any blank area from the optical disc 3. Then, the system controller 4 controls the data memory 7 to send the updated RMD (the new RMD block or segment) to the recording and reproducing circuit 5. The system controller 4 controls the optical pickup 9 via the internal bus 8 and the recording and reproducing circuit 5, thereby writing the updated RMD (the new RMD block or segment) into the RMA in the R-information area 511 or 521 of the optical disc 3.

Figure 14:
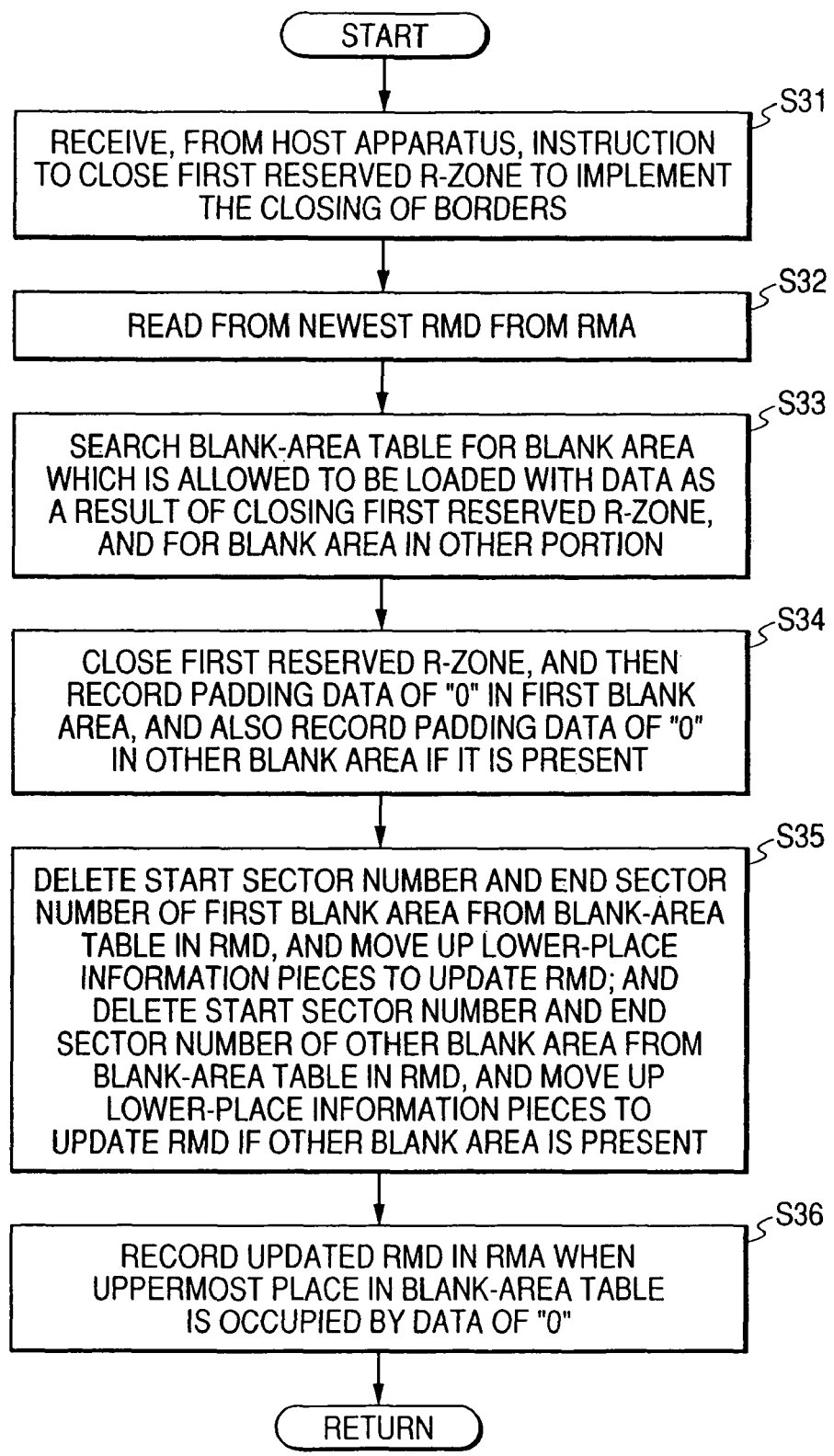
FIG. 14 is a flowchart of a third portion of the control program for the system controller in FIG. 6.

FIG. 14 is a flowchart of a portion (a subroutine) of the control program for the system controller 4 which relates to the above-mentioned operation of the optical-disc drive apparatus 2.

With reference to FIG. 14, a first step S31 of the program portion receives, from the host apparatus 1, the instruction to close the first reserved R-zone 101a to implement the closing of a border or the instruction to finalize the data recording on the optical disc 3 from the host apparatus 1.

A step S32 following the step S31 controls the optical pickup 9 via the internal bus 8 and the recording and reproducing circuit 5 in response to the received instruction, thereby reading the newest RMD block (RMD segment) from the RMA in the R-information area 511 or 521 of the optical disc 3. The step S32 stores the read-out newest RMD block (RMD segment) into the RMD recording section of the data memory 7.

A step S33 subsequent to the step S32 searches the blank-area table represented by the newest RMD block (RMD segment) in the data memory 7 for a blank area which is allowed to be loaded with data as a result of closing the first reserved R-zone 101a, and for a blank area in another portion of the optical disc 3 or blank areas in other portions of the optical disc 3. Specifically, the step S33 finds the first blank area 103a which is allowed to be loaded with data as a result of closing the first reserved R-zone 101a.

A step S34 following the step S33 sends padding data of "0" (that is, ineffective data) to the recording and reproducing circuit 5 and controls the optical pickup 9 via the internal bus 8 and the recording and reproducing circuit 5, thereby writing the padding data of "0" into the first reserved R-zone 101a in the optical disc 3. In this way, the first reserved R-zone 101a is closed, and changes to a used R-zone 101b as shown in FIG. 11. Thus, the first recording layer 501 in the first reserved R-zone 101a has been fully used so that the first blank area 103a is now allowed to be loaded with data. After the closing of the first reserved R-zone 101a, the step S34 sends padding data of "0" (that is, ineffective data) to the recording and reproducing circuit 5 and controls the optical pickup 9 via the internal bus 8 and the recording and reproducing circuit 5, thereby writing the padding data of "0" into the first blank area 103a in the optical disc 3. Thus, the first blank area 103a changes to a used area 103b as shown in FIG. 11. When there is another blank area (or other blank areas) in the optical disc 3, the step S34 functions to write the padding data of "0" into the blank area.

A step S35 subsequent to the step S34 accesses the data memory 7, and deletes the start address number and the end address number of the first blank area 103a from the blank-area table and moves up information pieces representative of the start address number and the end address number of a later blank area (or later blank areas) in the blank-area table to update the RMD in the data memory 7 and generate a new RMD block (RMD segment). The step S35 writes data of "0" into the places in the blank-area table where the moved-up information pieces originally exist. Also in the presence of the other blank area which is filled with the padding data of "0" at this stage, the step S35 deletes the start address number and the end address number of the other blank area from the blank-area table and moves up information pieces representative of the start address number and the end address number of a later blank area (or later blank areas) in the blank-area table to update the RMD in the data memory 7 and generate a new RMD block (RMD segment). The step S35 writes data of "0" into the places in the blank-area table where the moved-up information pieces originally exist.

A step S36 following the step S35 checks the blank-area table to detect whether the uppermost field storage location in the blank-area table is filled with data of "0". When the uppermost field storage location in the blank-area table is filled with data of "0", the step S36 decides the absence of any blank area from the optical disc 3. Then, the step S36 controls the data memory 7 to send the updated RMD (the new RMD block or segment) to the recording and reproducing circuit 5. The step S36 controls the optical pickup 9 via the internal bus 8 and the recording and reproducing circuit 5, thereby writing the updated RMD (the new RMD block or segment) into the RMA in the R-information area 511 or 521 of the optical disc 3. After the step S36, the current execution cycle of the program portion ends and then the program returns to the main routine. On the other hand, when the uppermost field storage location in the blank-area table is not filled with data of "0", the step S36 decides the presence of at least one blank area in the optical disc 3. In this case, the program immediately exits from the step 36 before returning to the main routine.

As described above, the start sector number and the end sector number of each blank area are registered in the RMD in the data memory 7. The RMD in the data memory 7 is updated in accordance with changes in the conditions of blank areas which include the presence/absence conditions thereof and the positional conditions thereof. The updated RMD is sent from the data memory 7 before being recorded on the specified area in the optical disc 3. Thus, it is possible to know the presence/absence of a blank area and the position thereof by referring to the newest RMD read out from the specified area in the optical disc 3. Therefore, at the time of closing a border or finalizing the data recording on the optical disc 3, it is unnecessary to search for a blank area again. Accordingly, a time taken to close a border or finalize the data recording on the optical disc 3 can be shortened, and the optical-disc drive apparatus 2 is very convenient.

Second Embodiment

A second embodiment of this invention is similar to the first embodiment thereof except for design changes described hereafter. The second embodiment of this invention uses an optical disc 3A instead of the optical disc 3. The optical disc 3A is of a two-layer single-sided type. The optical disc 3A uses a digital versatile disc recordable (DVD-R).

As shown in FIG. 18, the optical disc 3A includes a laminate of a first recording layer 501 and a second recording layer 502. A reserved R-zone can be provided only in the first recording layer 501 of the optical disc 3A. A reserved R-zone can also be provided in both the first and second recording layers 501 of the optical disc 3A.

In the optical disc 3A of FIG. 18, a first reserved R-zone 301, a used R-zone 302, a second reserved R-zone 304, and an incomplete (or invisible) R-zone 306 are successively formed as viewed along a direction from the inner circumferential disc edge toward the outer circumferential disc edge. The first reserved R-zone 301 include portions of both the first and second recording layers 501 and 502. A part of the first recording layer 501 in the first reserved R-zone 301 has been used for data recording. The remaining part of the first recording layer 501 in the first reserved R-zone 301, and the whole of the second recording layer 502 therein are unused. The used R-zone 302 has portions of both the first and second recording layers 501 and 502 which have been used for data recording. The second reserved R-zone 304 has only a portion of the first recording layer 501. The whole of the second reserved R-zone 304 is unused. The incomplete (or invisible) R-zone 306 include portions of both the first and second recording layers 501 and 502. A part of the first recording layer 501 in the incomplete (or invisible) R-zone 306 has been used for data recording.

The first reserved R-zone 301, the used R-zone 302, the second reserved R-zone 304, and the incomplete (or invisible) R-zone 306 are given R-zone numbers #10, #11, #12, and #13, respectively. There is management information (RMD) in which the R-zone number of each R-zone is made into correspondence with a known sector number or numbers among the start sector number, the jump sector number, and the end sector number of the R-zone. The start sector number, the jump sector number, and the end sector number mean the sector-based start address, the sector-based jump address, and the sector-based end address, respectively. The management information is recorded on the RMA in the R-information area 511 or 521 of the optical disc 3A. The management information is also stored in the data memory 7 of the optical-disc drive apparatus 2.

Regarding the used R-zone 302, the start sector number, the jump sector number, and the end sector numbers are known. Regarding the incomplete (or invisible) R-zone 306 which has the used part, the start sector number and the end sector number ESNB are known. Regarding an invisible R-zone which is fully unused, the end sector number and the jump sector number are undecided. Regarding a reserved R-zone (the second reserved R-zone 304) which has only a portion of the first recording layer 501, the jump sector number is absent.

In FIG. 18, the used R-zone 302 given the R-zone number #11 has the start sector number XA, the jump sector number YA, and the end sector number ESNA. The start sector number XA is equal to the sector number of a point from which the data recording on the used R-zone 302 is started. The jump sector number YA is equal to the sector number of a point in the first recording layer 501 which is scanned immediately before the data recording on the first recording layer 501 is replaced by the data recording on the second recording layer 502 through a jumping process. The end sector number ESNA is equal to the sector number of a point at which the data recording on the used R-zone 302 is ended.

The optical disc 3A has prerecorded sync signals located at positions spaced at prescribed intervals. Specifically, during the manufacture of the optical disc 3A, sync signals are recorded thereon by cutting. The data recording on the optical disc 3A is implemented on a sector-by-sector basis while the positions of the sync signals are detected and used as references for positional control of the data recording.

Since only a part of the first recording layer 501 in the first reserved R-zone 301 has been used for data recording, there is a blank area 303 formed by the second recording layer 502 between the first reserved R-zone 301 and the used R-zone 302. Since the second reserved R-zone 304 which has only a portion of the first recording layer 501 is unused, there is a blank area 305 formed by the second recording layer 502 between the used R-zone 302 and the incomplete (or invisible) R-zone 306. The blank area 305 extends above the second reserved R-zone 304 sandwiched between the used R-zone 302 and the incomplete (or invisible) R-zone 306.

The blank area 303 has an end sector number XB determined by the start sector number XA of the used R-zone 302. The start sector number of the blank area 303 is equal to the end sector number ESNA of the used R-zone 302.

It is previously known that the diameter of the laser beam in the first recording layer 501 is greater than that at the second recording layer 502. Accordingly, an area in the second recording layer 502 on which a signal can be recorded by the laser beam passing through a used area in the first recording layer 501 is narrower than the used area in the first recording layer 501. Therefore, regarding the first reserved R-zone 301, the outer R-zone boundary at the second recording layer 502 is located inward of the outer circumference of the first reserved R-zone 301 in the first recording layer 501. The position of the outer R-zone boundary at the second recording layer 502 corresponds to the end sector number XB of the blank area 303 while the position of the outer circumference of the first reserved R-zone 301 in the first recording layer 501 corresponds to the start sector number XA of the used R-zone 302. On the other hand, regarding the used R-zone 302, the inner R-zone boundary at the second recording layer 502 is located outward of the inner circumference of the used R-zone 302 in the first recording layer 501. The position of the inner R-zone boundary at the second recording layer 502 corresponds to the end sector number ESNA of the used R-zone 302 while the position of the inner circumference of the used R-zone 302 in the first recording layer 501 corresponds to the start sector number XA of the used R-zone 302. The end sector number XB of the blank area 303 and the start sector number XA of the used R-zone 302 are in a prescribed relation. For example, the end sector number XB of the blank area 303 is equal to a value resulting from bit inversion of the start sector number XA of the used R-zone 302. Thus, the end sector number XB of the blank area 303 and the start sector number XA of the used R-zone 302 are in one-to-one correspondence. Therefore, the end sector number XB of the blank area 303 is calculated from the start sector number XA of the used R-zone 302. The position at the end sector number ESNA of the used R-zone 302 depends on the on-disc radial position at the start sector number XA of the used R-zone 302, and is decided in view of factors including the difference in diameter between the laser beam in the first recording layer 501 and the laser beam at the second recording layer 502.

The blank area 305 has an end sector number YB determined by the jump sector number YA of the used R-zone 302. The start sector number of the blank area 305 is equal to the end sector number ESNB of the incomplete (or invisible) R-zone 306.

The end sector number YB of the blank area 305 and the jump sector number YA of the used R-zone 302 are in a relation similar to that between the end sector number XB of the blank area 303 and the start sector number XA of the used R-zone 302. Accordingly, the end sector number YB of the blank area 305 is calculated from the jump sector number YA of the used R-zone 302 in a way similar to the calculation of the end sector number XB of the blank area 303 from the start sector number XA of the used R-zone 302.

To allow the blank areas 303 and 305 to be identified and detected, their start sector numbers and end sector numbers are registered in the RMD (the management information). The start sector numbers and the end sector numbers can be updated in accordance with changes of the blank areas 303 and 305.

As previously mentioned, in the management information, the R-zone number of each R-zone is made into correspondence with a known sector number or numbers among the start sector number, the jump sector number, and the end sector number of the R-zone. The management information is recorded on the RMA in the R-information area 511 or 521 of the optical disc 3A. The management information is also stored in the data memory 7 of the optical-disc drive apparatus 2. Accordingly, the blank areas 303 and 305 can also be identified and detected in the case where the R-zone numbers are registered in the management information and are suitably updated.

For example, the R-zone numbers #10 and #11 are designated with respect to the management information, and the corresponding sector numbers including the start sector number XA and the end sector number ESNA related to the R-zone number #11 are derived from the management information. It is detected or decided from the start sector number XA and the end sector number ESNA related to the R-zone number #11 that there is a blank area 303 having the start sector number ESNA and the end sector number XB and formed by the second recording layer 502 between the R-zones having the R-zone numbers #10 and #11.

In addition, the R-zone numbers #11 and #13 are designated with respect to the management information, and the corresponding sector numbers including the jump sector number YA related to the R-zone number #11 and the end sector number ESNB related to the R-zone number #13 are derived from the management information. It is detected or decided from the jump sector number YA related to the R-zone number #11 and the end sector number ESNB related to the R-zone number #13 that there is a blank area 305 having the start sector number ESNB and the end sector number YB and formed by the second recording layer 502 between the R-zones having the R-zone numbers #11 and #13.

In the case where the incomplete (or invisible) R-zone 306 outward of and adjacent to the second reserved R-zone 304 is fully unused, the end sector number of the incomplete R-zone 306 is undecided. Even in this case, it is detected or decided that there is a blank area 305 having the end sector number YB and formed by the second recording layer 502 above the second reserved R-zone 304. Preferably, the start sector number of the blank area 305 is provisionally set to a prescribed value (for example, "0"). After data is recorded on at least a part of the incomplete (or invisible) R-zone 306 so that the end sector number ESNB of the incomplete R-zone 306 is decided, the start sector number of the blank area 305 is updated from the prescribed value to the value ESNB.

As understood from the above description, at least the end sector number of each blank area is registered in the RMD in the data memory 7. The RMD in the data memory 7 is updated in accordance with changes in the conditions of blank areas which include the presence/absence conditions thereof and the positional conditions thereof. The updated RMD is sent from the data memory 7 before being recorded on the specified area in the optical disc 3A. Thus, it is possible to know the presence/absence of a blank area and the position thereof by referring to the newest RMD read out from the specified area in the optical disc 3A. Therefore, at the time of closing borders or finalizing the data recording on the optical disc 3A, it is unnecessary to search for a blank area again. Accordingly, a time taken to close borders or finalize the data recording on the optical disc 3A can be shortened, and the optical-disc drive apparatus 2 is very convenient.

Third Embodiment

A third embodiment of this invention is similar to the first or second embodiment thereof except that the optical disc 3 or 3A uses a rewritable disc rather than a DVD-R. The number of times of recording data on a same area in the rewritable disc is relatively limited. An example of the rewritable disc is a digital versatile disc rewritable (DVD-RW).

In a virgin DVD-RW, both first and second recording layers are unused. Thus, during the first recording of data on a virgin DVD-RW, there may occur a blank area. Blank areas in a DVD-RW are processed as those in a DVD-R are.

Fourth Embodiment

A fourth embodiment of this invention is similar to the first or to second embodiment thereof except that the optical disc 3 or 3A uses a three-layer single-sided optical disc recordable or rewritable. The three-layer single-sided optical disc recordable or rewritable may be replaced by a four-layer or more-layer single-sided optical disc recordable or writable. In addition, the three-layer single-sided optical disc recordable or rewritable may be replaced by an optical disc recordable or writable which has two or more recording layers at each of the two disc sides.

Fifth Embodiment

A fifth embodiment of this invention is similar to the first or second embodiment thereof except for design changes described hereafter.

According to the fifth embodiment of this invention, the control program for the system controller 4 is initially stored in a recording medium. The recording medium is connected with the optical-disc drive apparatus 2 and is driven therein so that the control program is loaded from the recording medium into the program memory 6.

Alternatively, the control program may be downloaded to the program memory 6 via a transmission line or a communication line.

What is claimed is:

1. An apparatus for recording information on a removable optical disc having a plurality of recording layers including first and second recording layers, the recording layers having management areas respectively, the optical disc being of one of a recordable type and a rewritable type, the apparatus comprising:

an optical pickup for emitting a laser beam, wherein the first recording layer is the closest to the optical pickup while the second recording layer is the farthest from the optical pickup;

first means for controlling the optical pickup to apply the emitted laser beam to the optical disc to implement arbitrary-information recording on the recording layers in an order from the first recording layer to the second recording layer;

second means provided in the first means for controlling the optical pickup to apply the emitted laser beam to the second recording layer through a used area in the first recording layer to record arbitrary information on at least a part of the second recording layer, wherein the used area in the first recording layer has been used for arbitrary-information recording;

third means for generating positional information of a blank area in the second recording layer which occurs due to the presence of an unused area in the first recording layer, the blank area adjoining the unused area; and fourth means for recording the positional information generated by the third means on the management areas in an order from the management area in the first recording layer to the management area in the second recording layer.

2. An apparatus as recited in claim 1, further comprising:

fifth means for reading out the positional information from the optical disc in cases where the optical disc is removed from the apparatus and is then inserted in the apparatus again; and sixth means for recording predetermined information on the blank area in response to the positional information read out by the fifth means.

3. A method of recording information on a removable optical disc while using an optical pickup for emitting a laser beam, the optical disc having a plurality of recording layers including first and second recording layers, the recording layers having management areas respectively, the optical disc being of one of a recordable type and a rewritable type, wherein the first recording layer is the closest to the optical pickup while the second recording layer is the farthest from the optical pickup, the method comprising the steps of:

controlling the optical pickup to apply the emitted laser beam to the optical disc to implement arbitrary-information recording on the recording layers in an order from the first recording layer to the second recording layer, and controlling the optical pickup to apply the emitted laser beam to the second recording layer through a used area in the first recording layer to record arbitrary information on at least a part of the second recording layer, wherein the used area in the first recording layer has been used for arbitrary-information recording;

generating positional information of a blank area in the second recording layer which occurs due to the presence of an unused area in the first recording layer, the blank area adjoining the unused area; and recording the generated positional information on the management areas in an order from the management area in the first recording layer to the management area in the second recording layer.

4. A method as recited in claim 3, further comprising the steps of:

reading out the positional information from the optical disc in cases where the optical disc is removed from a disc drive apparatus and is then inserted in the disc drive apparatus again; and recording predetermined information on the blank area in response to the read-out positional information.

* * * * *

UNITED STATES PATENT AND TRADEMARK OFFICE
CERTIFICATE OF CORRECTION

PATENT NO. : 7,839,745 B2
APPLICATION NO. : 12/461935
DATED : November 23, 2010
INVENTOR(S) : Yasuhiko Teranishi and Kenki Yoshihara It is certified that error appears in the above-identified patent and that said Letters Patent is hereby corrected as shown below:

Add the following to the Title Page:

Item (62)    Related U.S. Application Data

Division of application No. 11/213,821, filed on Aug. 30, 2005, now Pat No. 7,602,687

Item (30)    Foreign Application Priority Data

Oct. 18, 2004    (JP)................................2004-303583
Dec. 2, 2004     (JP)................................2004-349272

Signed and Sealed this
First Day of February, 2011

David J. Kappos
*Director of the United States Patent and Trademark Office*